H. L. FEARING.
FISH HOOK.
APPLICATION FILED FEB. 27, 1911.
1,050,529.
Patented Jan. 14, 1913.
2 SHEETS—SHEET 1.
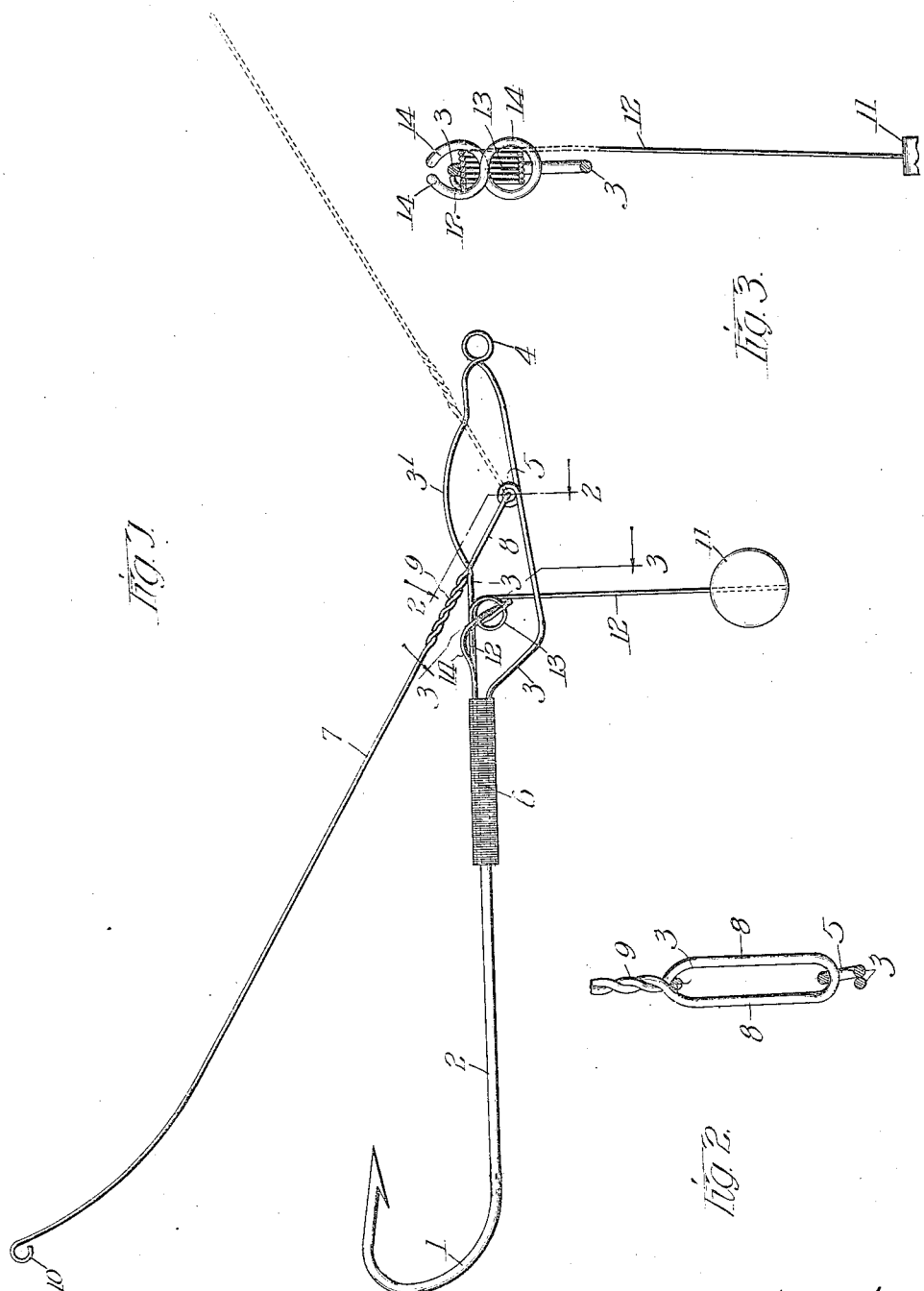

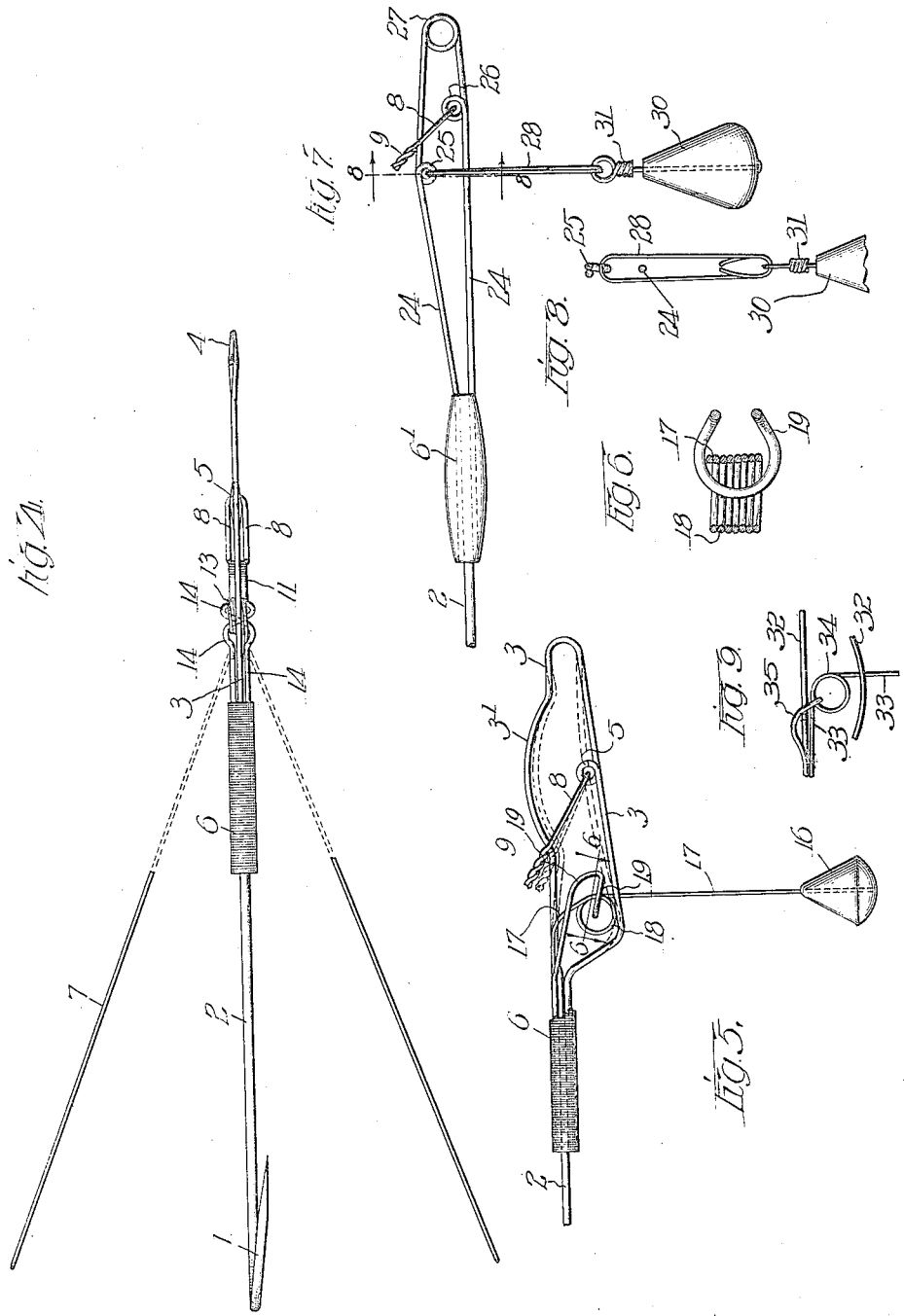

UNITED STATES PATENT OFFICE.

HENRY L. FEARING, OF CHICAGO, ILLINOIS.

FISH-HOOK.

1,050,529.  Specification of Letters Patent.  Patented Jan. 14, 1913.

Application filed February 27, 1911. Serial No. 611,116.

*To all whom it may concern:*

Be it known that I, HENRY L. FEARING, a citizen of the United States, residing at Chicago, in the county of Cook and State of Illinois, have invented certain new and useful Improvements in Fish-Hooks, of which the following is a description.

My invention belongs to that general class of devices known as fish hooks, and relates particularly to a weedless hook provided with means for maintaining the same in proper position when in use, and has among its objects the production of a simple, efficient and satisfactory hook of the kind described for use wherever found applicable.

To this end my invention consists in the novel construction, arrangement and combination of parts herein shown and described, and more particularly pointed out in the claims.

In the drawings, wherein like reference characters indicate like or corresponding parts, Figure 1 is a side elevation of one form of hook. Fig. 2 is a sectional view taken substantially on line 2, 2 of Fig. 1. Fig. 3 is a sectional view taken substantially on line 3, 3 of Fig. 1. Fig. 4 is a top elevation of a form of hook shown in Fig. 1. Fig. 5 is a side elevation of a portion of a modified form of hook. Fig. 6 is a sectional view taken substantially on line 6, 6 of Fig. 5. Fig. 7 is a side elevation of a portion of a modified form of hook. Fig. 8 is a sectional view taken substantially on line 8, 8 of Fig. 7, and Fig. 9 is a side elevation of a portion of a slightly modified form of hook.

Referring particularly to Figs. 1 to 4 of the drawings, 1 represents the hook provided with the usual barb and with a shank 2, the hook being of any suitable or desired material, size and general form. The shank 2 is preferably provided with a resilient looped auxiliary shank 3, which may be formed integral with the shank 2, as illustrated in the modified form shown in Fig. 5, or separate therefrom and secured to the shank by a winding 6 of cord or wire or the equivalent. The auxiliary shank 3 is preferably bowed or curved as at $3^1$ and formed with loops 4 and 5. The hook is provided with a guard, consisting of arms 7, 7 (see Fig. 4) preferably of resilient or flexible material, which is passed through the loop 5 and extended up as at 8, 8, embracing the top side of the loop or shank 3, above which it is twisted as at 9, or otherwise secured together by solder, or equivalent means. The engagement with the loop 5 gives a hinged or pivotal connection between the two, so that the guard may lie in the position indicated by the full lines in Fig. 1, or be thrown backward as indicated by the dotted lines to the right, the upper side of the looped shank preventing transverse movement of the guard. The line or leader is secured in the loop 4, or its equivalent, it being understood that any additional attachment, such as a spinner or the like, may be provided. When passing through weeds the guards 7 guard the hook, preventing the weeds from catching the same. When the fish is running with the hook and line, if passing through the weeds, the guards 7 will be thrown, as indicated by the dotted lines to the right, and when in either position pressure upon the ends of the guards is not only resiliently opposed by the guards, but also by the resilient loop 3, inasmuch as the two sides of the loop are squeezed together. This is illustrated in the modified form shown in Fig. 5, which is hereafter described, the two sides of the auxiliary shank being shown squeezed together, as indicated in the dotted lines. It may be mentioned that by having the loop resilient and the guards secured thereto instead of to a non-yielding part, the guards may be made somewhat stiffer. If desired, the ends of the guards may be turned back as at 10 so as to give a finish and prevent any comparatively sharp points.

Secured to one of the shank parts, as shown on the shank part 2, and extending therefrom in the plane of the hook on the opposite side of the shank, is a depending stem 12 provided with a weight or sinker 11 of suitable material. The stem is preferably yieldable. As shown, it is flexible and resilient so that the weight may be displaced longitudinally of the shank in either direction when the hook is drawn or carried through the weeds. The stem may be secured to the shank in any suitable way, a very convenient way being shown in the drawings, in which it is extended and secured by the winding 6. The stem may be provided with a resilient loop 13 and braced by a bracing member 14, or its equivalent. The bracing 14 is also secured by the winding 6, and substantially closes over the top of the auxiliary shank 3, and thence extends through the loop 13, passing through the loop twice and engaging the stem near the top and bottom, thereby bracing the stem and more securely fastening the same in place. The brace 14 also tends to prevent transverse movement of the stem relative to the shank of the hook. As is obvious, when the hook is drawn through the weeds, when fishing or when carried by the fish, the stem and weight are easily deflected in running through weeds so that they do not catch the same, but at the same time the hook is always normally maintained in proper position so as to keep the bait right side up. This is important inasmuch as where the weight is on the shank, or in such position that it will not maintain the hook substantially as shown in Fig. 1, the bait will turn wrong side up, or partially so, and therefore not be as efficient. By having a depending weight, the weight of the bait, the hook and the guards are counterbalanced. It may also be mentioned that in going through weeds the yielding stem and weight, and the yielding guards, oppose each other, so that there is no tendency for the hook to be tipped, as would be the case if the resilient part was only on one side. There is therefore less chance to lose the bait.

The form of hook shown in Fig. 5 is substantially similar except that the resilient loop 18 in the stem 17, which carries the weight 16 is engaged on one side by the brace 19, which is merely a modification of the brace shown in the previous figures. In this figure the resiliency of the loop before mentioned is illustrated by the dotted lines, and the shank 2 and auxiliary shank 3 are formed integral. By bowing the shank, as at 3¹, as before mentioned, the resiliency of the shank is somewhat increased, and the guards more efficiently guided when moved to either extreme position.

In the Figs. 7 and 8, a slightly modified construction of both auxiliary shank and weight is shown. In this form the resilient loop or shank is formed as at 24 and provided with loops 25, 26 and 27. A guard similar to that shown in Fig. 1 is provided, only a portion of the same being shown. In this case while the sinker or weight is yieldingly secured to the shank, in this case to the auxiliary shank, it is not resilient. Referring to the Figs. 7 and 8, the stem 28 is in the form of a link, which passes through the loop 25 and embraces the lower side of the shank. To the lower end of the stem or link 28 is preferably pivotally secured a weight 30, the same being provided with an eye or loop 31, which may be swiveled to the weight 30 if desired. The operation of this form of weight is substantially the same as the others, but owing to the fact that it embraces both sides of the lower part 24, the stem cannot move transversely, but only longitudinally of the shank. The weight, however, as is obvious, has a slight transverse movement, if pivotally secured to the stem, as shown, but being at the end of the stem, it maintains the hook in proper position.

The construction shown with Fig. 9 is substantially similar to Figs. 1 and 5, except that the resilient stem 33, provided with the loop 34, is supported or braced at the top by the brace 35. This is merely a modified form of brace shown in Fig. 1, which embraces both sides of the loop, or shown in Fig. 5 it engages the side of the loop instead of the top. It will thus be seen that my hook will always be maintained in the proper position in the water, thereby keeping the bait in its natural position, and that it is weedless when drawn through the water in either direction; also that the weed or sinker being yieldingly supported, does not impede the passage of the hook, but on the contrary, counterbalances the hook when the guards 7 are depressed by weeds.

Having thus described my invention, it is obvious that various immaterial modifications may be made in the same without departing from the spirit of my invention, hence I do not wish to be understood as limiting myself to the exact form, construction or combination of parts herein shown and described or uses mentioned.

What I claim as new and desire to secure by Letters Patent is:—

1. A device of the kind described comprising a suitable hook provided with a looped resilient auxiliary shank, the sides of said loop extending substantially in the plane of the bend of the hook, in combination with a weight, and means for yieldably securing said weight to the shank on the side opposite the hook, but in the plane thereof.

2. A device of the kind described comprising a hook provided with a looped resilient auxiliary shank, the sides of the loop extending substantially in the plane of the bend of the hook, in combination with guards secured to said looped shank and a flexible stem extending from said shank, in the plane of the loop and upon the opposite side of the shank to a weight secured at the free end of said flexible stem.

3. A device of the kind described comprising a suitable hook provided with a looped resilient auxiliary shank, the sides of the loop extending substantially in the plane of the bend of the hook, in combination with resilient guards provided with a common loop thereto with the extremity pivotally attached to one side of the looped shank and embracing the other member of the loop and adapted to loosely rest thereon when extended in either direction, and a weight yieldably secured to said shank and extending in a direction parallel with the plane of the hook, but on the opposite side of the shank.

4. A device of the kind described comprising a suitable hook provided with a looped resilient auxiliary shank, the sides of the loop extending substantially in the plane of the bend of the hook, in combination with resilient guards provided with a common loop pivotally attached at the extremity of the first mentioned loop to one side of the looped shank and embracing the other member of the loop and adapted to loosely rest there when extended in either direction, a weight and a flexible connection between the weight and the shank, said connection extending in a direction parallel with the plane of the hook, but on the opposite side of the shank, and means for bracing said connection.

5. A device of the kind described comprising a hook provided with a barb and shank, said shank provided with an eye thereon, in combination with a pair of resilient diverging guards provided with a loop at their meeting ends extended through said eye, and a weight secured to said shank on one side thereof.

6. A device of the character described, comprising a hook provided with a looped resilient shank, the sides of said loop extending substantially in the plane of the bend of the hook, a guard pivotally connected to the lower side of said looped resilient shank intermediate the ends thereof, said guard being provided with portions coöperating with the upper side of the looped resilient shank to hold the same against lateral movement.

In testimony whereof, I have hereunto signed my name in the presence of two subscribing witnesses.

HENRY L. FEARING.

Witnesses:
  Roy W. Hill,
  Charles I. Cobb.